(12) United States Patent
Goto

(10) Patent No.: US 8,964,900 B2
(45) Date of Patent: Feb. 24, 2015

(54) RECEIVING APPARATUS, RECEIVING METHOD, AND PROGRAM

(75) Inventor: Yuken Goto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/002,310

(22) PCT Filed: Mar. 29, 2012

(86) PCT No.: PCT/JP2012/058306
§ 371 (c)(1),
(2), (4) Date: Aug. 29, 2013

(87) PCT Pub. No.: WO2012/137657
PCT Pub. Date: Oct. 11, 2012

(65) Prior Publication Data
US 2013/0336431 A1    Dec. 19, 2013

(30) Foreign Application Priority Data
Apr. 6, 2011    (JP) ................ 2011-084502

(51) Int. Cl.
*H04L 27/00*    (2006.01)
*H04L 27/26*    (2006.01)
(Continued)

(52) U.S. Cl.
CPC .............. *H04L 27/2666* (2013.01); *H04N 5/50* (2013.01); *H04N 21/6118* (2013.01); *H04N 21/42607* (2013.01); *H04N 21/4384* (2013.01); *H04N 21/4385* (2013.01); *H04N 21/4382* (2013.01); *H04H 20/76* (2013.01); *H04H 20/93* (2013.01); *H04L 5/0053* (2013.01); *H04L 5/0091* (2013.01); *H04L 27/2655* (2013.01); *H04L 27/2685* (2013.01)
USPC .......................................... 375/316

(58) Field of Classification Search
USPC ................................. 375/316, 260
See application file for complete search history.

(56) References Cited

U.S. PATENT DOCUMENTS

2009/0304099 A1*   12/2009   Waller et al. ............. 375/260
2011/0280327 A1*   11/2011   Ko et al. .................. 375/260

FOREIGN PATENT DOCUMENTS

JP     2009-296586      12/2009
WO    WO-2006/030974    3/2006

OTHER PUBLICATIONS

International Search Report; International Application No. PCT/JP2012/058306; International Filing Date: Mar. 29, 2012; Completion of the International Search Report: May 22, 2012. (PCT/ISA/210).

(Continued)

*Primary Examiner* — Kevin Kim
(74) *Attorney, Agent, or Firm* — Rader, Fishman & Grauer PLLC

(57) ABSTRACT

Disclosed are a receiving apparatus, a receiving method, and a program capable of shortening time taken in tuning. A broadband signal where a plurality of signals is arranged is received. Control information used to extract a predetermined signal from the broadband signal is obtained from the broadband signal. The obtained control information is stored. After the control information is stored, the stored control information is read when a predetermined signal is extracted from the broadband signal. The predetermined signal is extracted from the broadband signal based on the read control information. This technology is applicable to a receiving apparatus that receives a signal according to a DVB-C2 standard.

6 Claims, 13 Drawing Sheets

| (51) | Int. Cl. | |
|---|---|---|
| | H04N 5/50 | (2006.01) |
| | H04N 21/61 | (2011.01) |
| | H04N 21/426 | (2011.01) |
| | H04N 21/438 | (2011.01) |
| | H04N 21/4385 | (2011.01) |
| | H04H 20/76 | (2008.01) |
| | H04H 20/93 | (2008.01) |
| | H04L 5/00 | (2006.01) |

(56) References Cited

OTHER PUBLICATIONS

Written Opinion of the International Searching Authority; International Application No. PCT/JP2012/058306; International Filing Date: Mar. 29, 2012; Dated: Jun. 5, 2012. (Form PCT/ISA/220 and PCT/ISA/237).

* cited by examiner

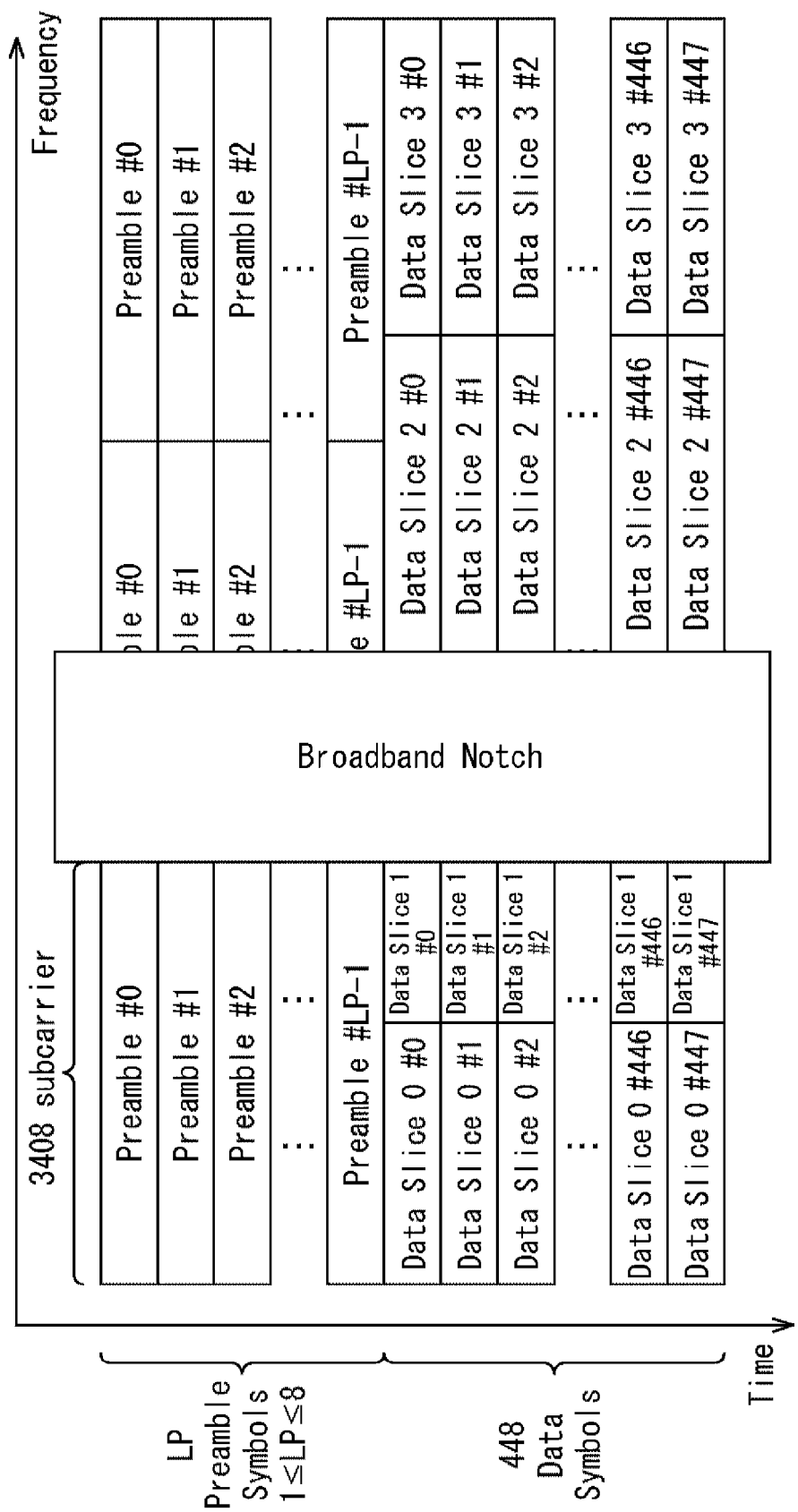

FIG. 6

| | Field | Size (bits) |
|---|---|---|
| 1 | NETWORK_ID | 16 |
| 2 | C2_SYSTEM_ID | 16 |
| 3 | START_FREQUENCY | 24 |
| 4 | C2_BANDWIDTH | 16 |
| 5 | GUARD_INTERVAL | 2 |
| 6 | C2_FRAME_LENGTH | 10 |
| 7 | L1_PART2_CHANGE_COUNTER | 8 |
| 8 | NUM_DSLICE | 8 |
| 9 | NUM_NOTCH | 4 |
| 10 | for i=0..NUM_DSLICE−1 { | |
| 11 | DSLICE_ID | 8 |
| 12 | DSLICE_TUNE_POS | 14 or 13 |
| 13 | DSLICE_OFFSET_LEFT | 9 or 8 |
| 14 | DSLICE_OFFSET_RIGHT | 9 or 8 |
| 15 | DSLICE_TI_DEPTH | 2 |
| 16 | DSLICE_TYPE | 1 |
| 17 | if DSLICE_TYPE=='1' { | |
| 18 | FEC_HEADER_TYPE | 1 |
| 19 | } | |
| 20 | DSLICE_CONST_CONF | 1 |
| 21 | DSLICE_LEFT_NOTCH | 1 |
| 22 | DSLICE_NUM_PLP | 8 |
| 23 | for i=0..DSLICE_NUM_PLP−1 { | |
| 24 | PLP_ID | 8 |
| 25 | PLP_BUNDLED | 1 |
| 26 | PLP_TYPE | 2 |
| 27 | PLP_PAYLOAD_TYPE | 5 |
| 28 | if PLP_TYPE=='00' or '01' { | |
| 29 | PLP_GROUP_ID | 8 |
| 30 | } | |
| 31 | if DSLICE_TYPE=='0' { | |
| 32 | PLP_START | 14 |
| 33 | PLP_FEC_TYPE | 1 |
| 34 | PLP_MOD | 3 |
| 35 | PLP_COD | 3 |
| 36 | } | |
| 37 | PSI/SI_REPROCESSING | 1 |
| 38 | if PSI/SI_REPROCESSING=='0' { | |
| 39 | transport_stream_id | 16 |
| 40 | original_network_id | 16 |
| 41 | } | |
| 42 | RESERVED_1 | 8 |
| 43 | } | |
| 44 | RESERVED_2 | 8 |
| 45 | } | |
| 46 | for i=0..NUM_NOTCH−1 { | |
| 47 | NOTCH_START | 14 or 13 |
| 48 | NOTCH_WIDTH | 9 or 8 |
| 49 | RESERVED_3 | 8 |
| 50 | } | |
| 51 | RESERVED_TONE | 1 |
| 52 | RESERVED_4 | 16 |

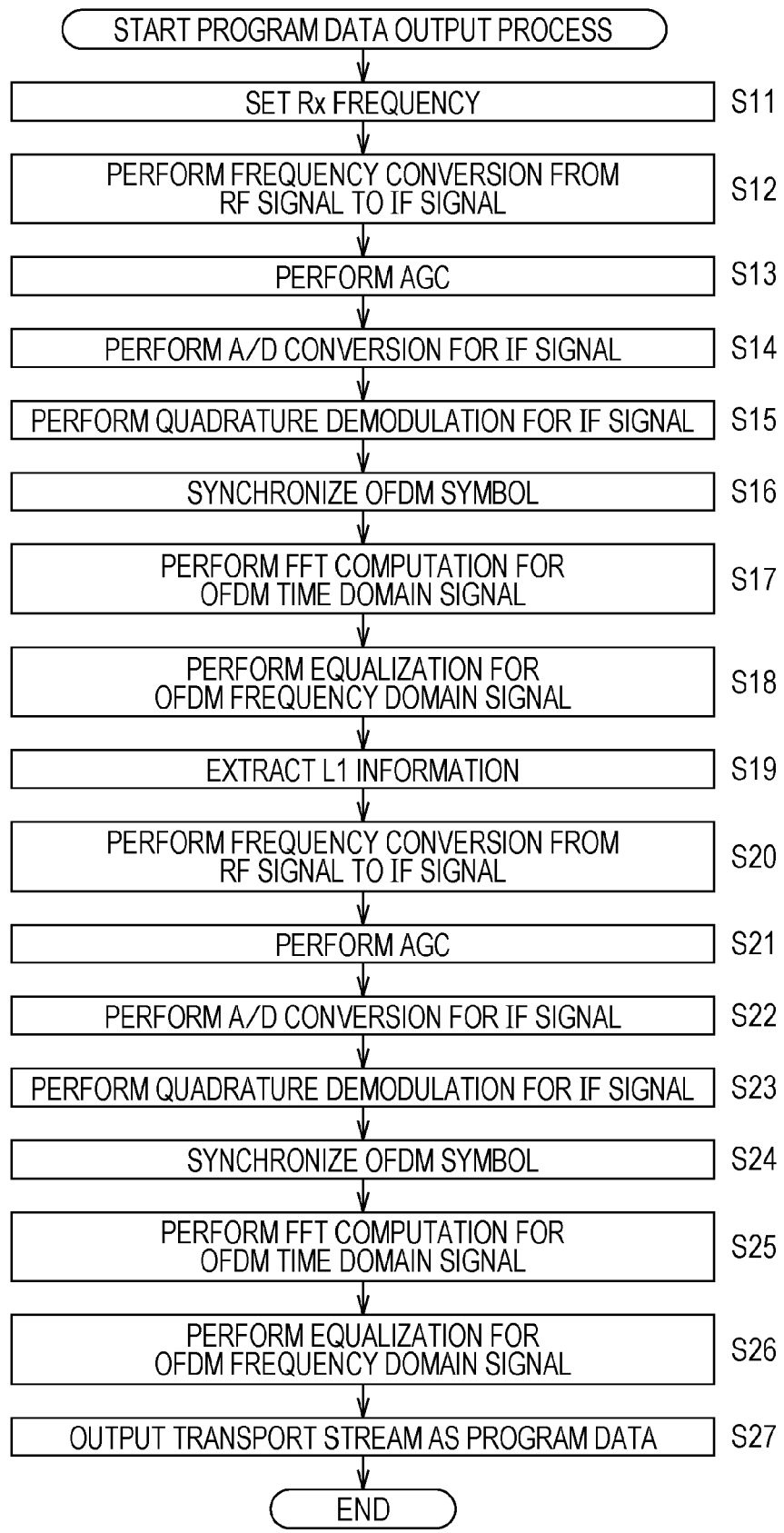

FIG. 11

| ID | CENTER FREQUENCY | DDS |
|---|---|---|
| 0 | $f_0$ | |
| 1 | $f_1$ | |
| 2 | $f_2$ | ○ |
| 3 | $f_3$ | |
| . | . | |
| . | . | . |
| . | . | . |
| . | . | . |
| . | . | . |
| N | $f_N$ | |

~101

RECEIVING APPARATUS, RECEIVING METHOD, AND PROGRAM

TECHNICAL FIELD

The present technology relates to a receiving apparatus, a receiving method, and a program. More particularly, the present technology relates to a receiving apparatus, a receiving method, and a program capable of expediting a tuning operation to an instructed channel from a broadband signal.

BACKGROUND ART

In recent years, there has been an outstanding progress in a digitalization technology of a broadcast system. In a terrestrial television broadcast system in Japan or Europe, a modulation scheme called an orthogonal frequency division multiplexing (OFDM) resistant to an influence of a multi-path interference is employed in modulation.

The OFDM scheme is also employed in a European cable broadcasting system. According to a second generation European cable digital broadcasting standard DVB-C2, in order to prevent an interference with other communication channels, data is not transmitted by setting a transmission power to zero in a certain frequency band called a notch while a signal is transmitted (for example, refer to Non-Patent Document 1).

CITATION LIST

Non-Patent Document

Non-Patent Document 1: Digital Video Broadcasting (DVB), Frame structure channel coding and modulation for a second generation digital transmission system for cable systems (DVB-C2), DVB Document A138

SUMMARY OF THE INVENTION

Problems to be Solved by the Invention

As described above, according to DVB-C2, a notch is provided to prevent an interference with other communication channels. Therefore, it is possible to eliminate necessity of providing a guard band between channels and use even a relatively narrow band interposed between notches to transmit data. Accordingly, it is possible to effectively use a frequency band. Since it is possible to effectively use a frequency band, it is possible to increase the number of channels, compared to the number of channels of the related art. However, it is desirable to prevent time taken in a tuning process from increasing as the number of channels increases.

In view of the aforementioned problems, the present technology provides a receiving apparatus, a receiving method, and a program capable of shortening time taken in the tuning process.

Solutions to Problems

According to an aspect of the present technology, there is provided a receiving apparatus including: a memory unit that obtains, from a broadband signal, control information used to extract a predetermined signal from the broadband signal where a plurality of signals is arranged and stores the control information; and an extraction unit that reads the control information stored in the memory unit to extract the predetermined signal and extracts the predetermined signal from the broadband signal based on the control information.

The broadband signal may be a signal conforming to a DVB-C2 standard, and the control information may be information on a frequency used to extract the predetermined signal.

In a case where it is difficult to extract the predetermined signal using the extraction unit, the control information may be obtained from the broadband signal, and the predetermined signal may be extracted based on the obtained control information.

In a case where a no-signal band is included in the predetermined signal, the control information may be obtained from the broadband signal using a frequency set in a transmit side of the broadband signal, and the extraction unit may extract the predetermined signal based on the obtained control information.

According to an aspect of the present technology, there is provided a receiving method including: obtaining, from a broadband signal, control information used to extract a predetermined signal from the broadband signal where a plurality of signals is arranged and storing the control information in a memory unit; and reading the control information stored in the memory unit to extract the predetermined signal and extracting the predetermined signal from the broadband signal based on the control information.

According to an aspect of the present technology, there is provided a program causing a computer to function as: a memory unit that obtains, from a broadband signal, control information used to extract a predetermined signal from the broadband signal where a plurality of signals is arranged and stores the control information; and an extraction unit that reads the control information stored in the memory unit to extract the predetermined signal from the broadband signal based on the control information.

According to an aspect of the present technology, the control information used to extract a predetermined signal is obtained from a broadband signal where a plurality of signals is arranged and stored. In addition, when the predetermined signal is extracted, the stored control information is used to extract a predetermined signal from the broadband signal.

Effects of the Invention

According to an aspect of the present technology, it is possible to shorten time taken to perform a tuning process.

BRIEF DESCRIPTION OF DRAWINGS

FIG. 5 is a diagram illustrating a configuration of C2 Frame in a case where a broadband notch exists.

FIG. 6 is a diagram illustrating parameters included in L1 information.

FIG. 7 is a flowchart illustrating a program data output process.

FIG. 11 is a diagram illustrating a table.

MODE FOR CARRYING OUT THE INVENTION

Hereinafter, embodiments of the present technology will be described with reference to the accompanying drawings.
<Exemplary Configuration of Receiving Apparatus>

Figure 1:
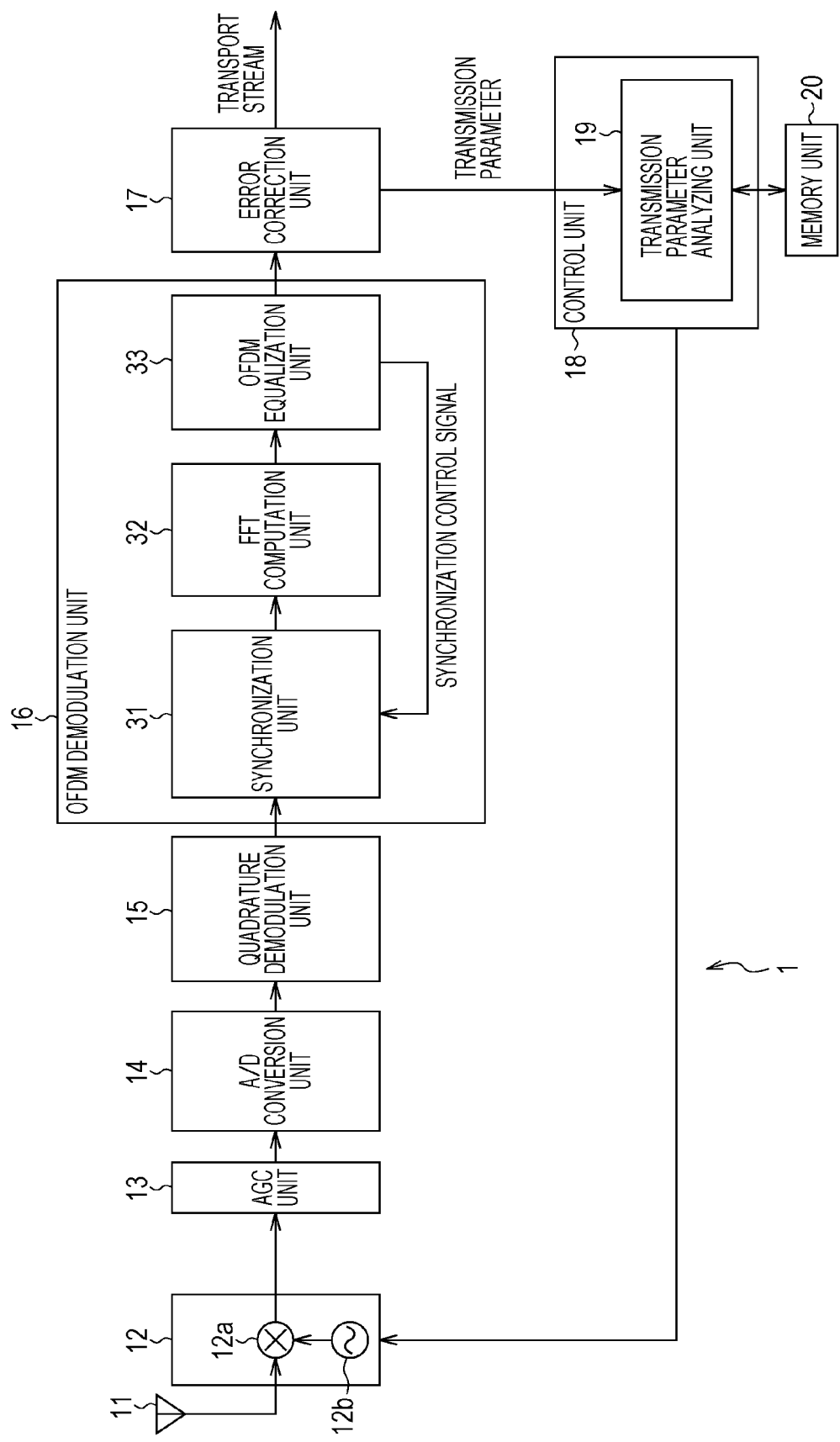
FIG. 1 is a block diagram illustrating a configuration of a receiving apparatus according to an embodiment.

FIG. 1 illustrates an exemplary configuration of a receiving apparatus according to an embodiment. A receiving apparatus 1 of FIG. 1 is an orthogonal frequency division multiplexing (OFDM) receiving apparatus that receives a broadcast wave of an OFDM signal transmitted from a transmitter of a broadcast station (not illustrated). An antenna 11 receives a broadcast wave (radio frequency (RF) signal) of the transmitted OFDM signal and outputs the broadcast wave to a tuner 12. The tuner 12 includes a computation unit 12a and a local oscillator 12b.

The computation unit 12a converts the RF signal to an intermediate frequency (IF) signal by multiplying the RF signal from the antenna 11 and the signal from the local oscillator 12b and outputs the IF signal to an automatic gain control (AGC) unit 13. The local oscillator 12b oscillates a sinusoidal signal having a predetermined frequency and outputs the sinusoidal signal to the computation unit 12a. The AGC unit 13 performs gain control for the supplied IF signal to obtain a constant signal level. The AGC unit 13 outputs the IF signal subjected to the gain control to an A/D conversion unit 14.

The A/D conversion unit 14 performs analog-digital (A/D) conversion for the IF signal from the AGC unit 13 and outputs the digital IF signal to a quadrature demodulation unit 15. The quadrature demodulation unit 15 performs quadrature demodulation for the IF signal from the A/D conversion unit 14 using a carrier wave having a predetermined frequency and outputs a baseband OFDM signal to the OFDM demodulation unit 16. Hereinafter, the baseband OFDM signal output from the quadrature demodulation unit 15 will be referred to as an OFDM time domain signal. As a result of the quadrature demodulation, the OFDM time domain signal is converted into a complex signal containing a real axis component (I-component) and an imaginary axis component (Q-component).

The OFDM demodulation unit 16 includes a synchronization unit 31, a fast Fourier transform (FFT) computation unit 32, and an OFDM equalization unit 33. The synchronization unit 31 synchronizes the OFDM symbol as a unit of signal transmission in the OFDM scheme. That is, the synchronization unit 31 determines a start position of a FFT block as a signal block for performing FFT in the FFT computation unit 32. The synchronization unit 31 can determine the start position of the FFT block based on the OFDM time domain signal before the FFT. However, after an equalization process in the OFDM equalization unit 33, the start position of the FFT block may be determined based on the equalized signal obtained by correcting a distortion in a transmission line. In this case, a synchronization control signal determined based on the equalized signal obtained by correcting a distortion in a transmission line is supplied from the OFDM equalization unit 33.

The FFT computation unit 32 sets, as a FFT block, a block corresponding to an effective symbol length from the start position of the FFT block determined by the synchronization unit 31 for the OFDM time domain signal from the quadrature demodulation unit 15. In addition, the FFT computation unit 32 extracts a signal of the FFT block from the OFDM time domain signal and performs FFT computation for the extracted signal. Through the FFT computation using the FFT computation unit 32, data transmitted through a subcarrier, that is, the OFDM signal representing a transmission symbol on an I-Q plane is obtained. The OFDM signal obtained through the FFT computation for the OFDM time domain signal is a frequency domain signal. Hereinafter, the OFDM signal subjected to the FFT computation will be referred to as an OFDM frequency domain signal.

The OFDM equalization unit 33 performs an equalization process for the OFDM frequency domain signal subjected to the FFT computation, in which an amplitude and a phase of the received signal is equalized to those of the transmitted signal, and outputs a resultant equalized signal. In the OFDM scheme, in which a quadrature amplitude modulation (QAM) modulation scheme is used as a modulation scheme for each subcarrier, a transmission signal is influenced by a multi-path propagation and the like. Therefore, amplitudes and phases of each carrier become different between the receive (Rx) side and the transmit (Tx) side. For example, a multi-path influence is generated due to reflection on a mountain or a building or a single frequency network (SFN).

In the OFDM scheme, an existing signal having a predetermined amplitude and a predetermined phase is discretely inserted into a transmission symbol of the transmission signal as a pilot signal. In the Rx side, a frequency characteristic of the transmission line is obtained based on the amplitude and the phase of the pilot signal to equalize the received signal.

An error correction unit 17 performs deinterleaving for the equalized signal supplied from the OFDM equalization unit 33. In addition, the error correction unit 17 performs various processes such as depuncturing, Viterbi decoding, removal of a spread spectrum signal, and Reed Solomon (RS) decoding. The error correction unit 17 outputs the decoded data (transport stream) obtained by performing various processes to an external output unit, an output buffer, or the like located in the subsequent stage. In addition, the error correction unit 17 outputs, to a transmission parameter interpreting unit 19 of a control unit 18, various transmission parameters as transmission control information out of the decoded data subjected to processing such as de-interleaving or error correction.

The control unit 18 controls each part of the receiving apparatus 1. For example, the control unit 18 sets an Rx frequency depending on an Rx channel set in a manipulation unit (not illustrated). That is, an oscillation frequency of the local oscillator 12b is set such that a predetermined frequency is output from the local oscillator 12b depending on the Rx frequency.

The control unit 18 has a transmission parameter interpreting unit 19. The transmission parameter interpreting unit 19 interprets the transmission parameters supplied from the error correction unit 17 and appropriately supplies necessary information to each part of the receiving apparatus 1. For example, the transmission parameter interpreting unit 19 obtains frequency band information representing a no-signal band out of the frequency bands that can be received by the receiving apparatus 1 and information on a frequency used to read a predetermined channel as one of the transmission parameters. Such information is supplied to and stored in a memory unit 20 as necessary. The information stored in the memory unit 20 is used in tuning and the like.

In the receiving apparatus 1 configured as described above, it is possible to shorten time taken to tune to a predetermined channel, for example, a channel instructed by a user. Here, according to the tuning process, description will now be made for receiving process of the receiving apparatus 1 by exemplifying a DVB-C2 signal as a second generation European cable digital broadcasting standard.

<DVB-C2 Signal>

Figure 2:
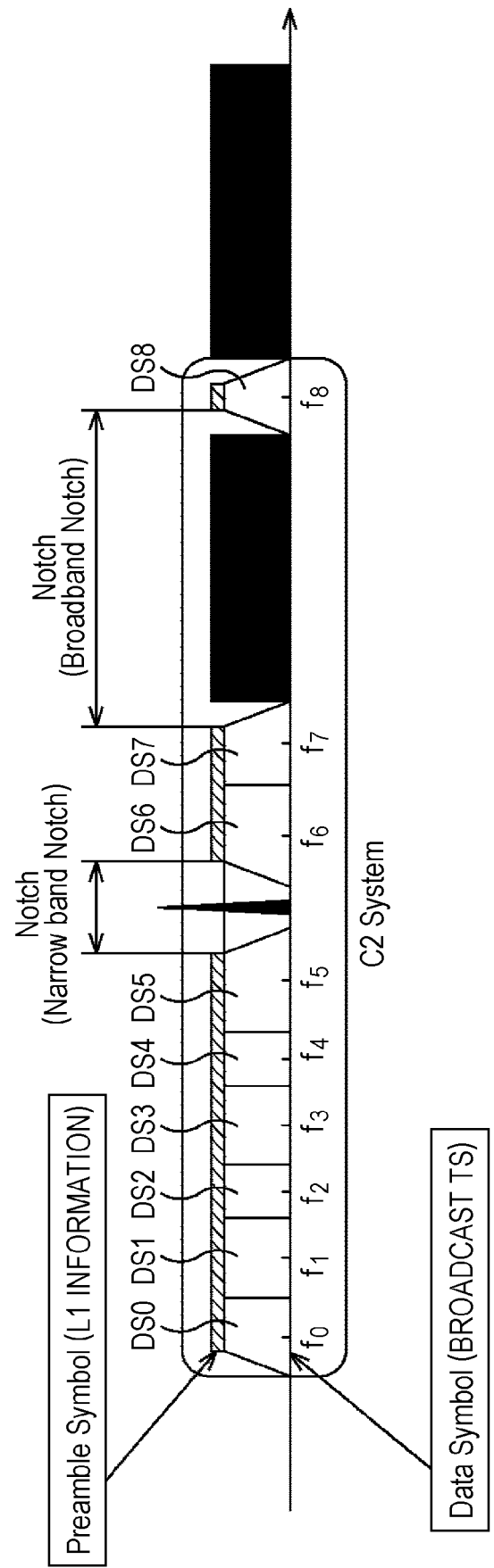
FIG. 2 is a diagram illustrating an exemplary DVB-C2 signal.

First, description will be made for a signal of DVB-C2 (hereinafter, also referred to as a DVB-C2 signal). FIG. 2 illustrates an exemplary DVB-C2 signal. In FIG. 2, the abscissa denotes a frequency. One signal of the DVB-C2 is called "C2 System". The C2 System includes Preamble Symbol and Data Symbol. According to the standard, one C2 System is a signal having a bandwidth of approximately 3.5 GHz at maximum.

Preamble Symbol is a symbol used to transmit L1 information (L1 signaling part 2 data) which is transmission control information. Information on a frequency band that does not transmit a signal is transmitted as a part of the L1 information. Using the Preamble Symbol, the same information is repeatedly transmitted at a cycle of 3,408 carriers (at a cycle of 3,408 subcarriers of OFDM). The 3,408 carriers correspond to a frequency band of 7.61 MHz.

Data Symbol is a symbol used to transmit Transport Stream (TS) such as program data. Data Symbol is divided into blocks called Data Slice. For example, different program data are transmitted using Data Slice 1 (DS1) and Data Slice 2 (DS2). Parameters regarding each Data Slice such as the number of Data Slices are also contained in the L1 information.

The frequency band indicated by a black portion in FIG. 2 is a frequency band reserved for FM broadcast, police wireless broadcast, military wireless broadcast, and the like and is not used to transmit C2 System. That is, the frequency band indicated by the black portion is a no-signal band out of a transmission signal output from a transmitter in C2 System and is referred to as a notch band.

The notch band includes a narrowband notch having a bandwidth smaller than 48 subcarriers and a broadband notch having a bandwidth greater than 47 subcarriers (equal to or greater 48 subcarriers). Information on the notch band such as the number of notches or bandwidths of each notch band is contained in the L1 information, which is transmission control information, as a transmission parameter.

<Configuration of C2 Frame>

Figure 3:
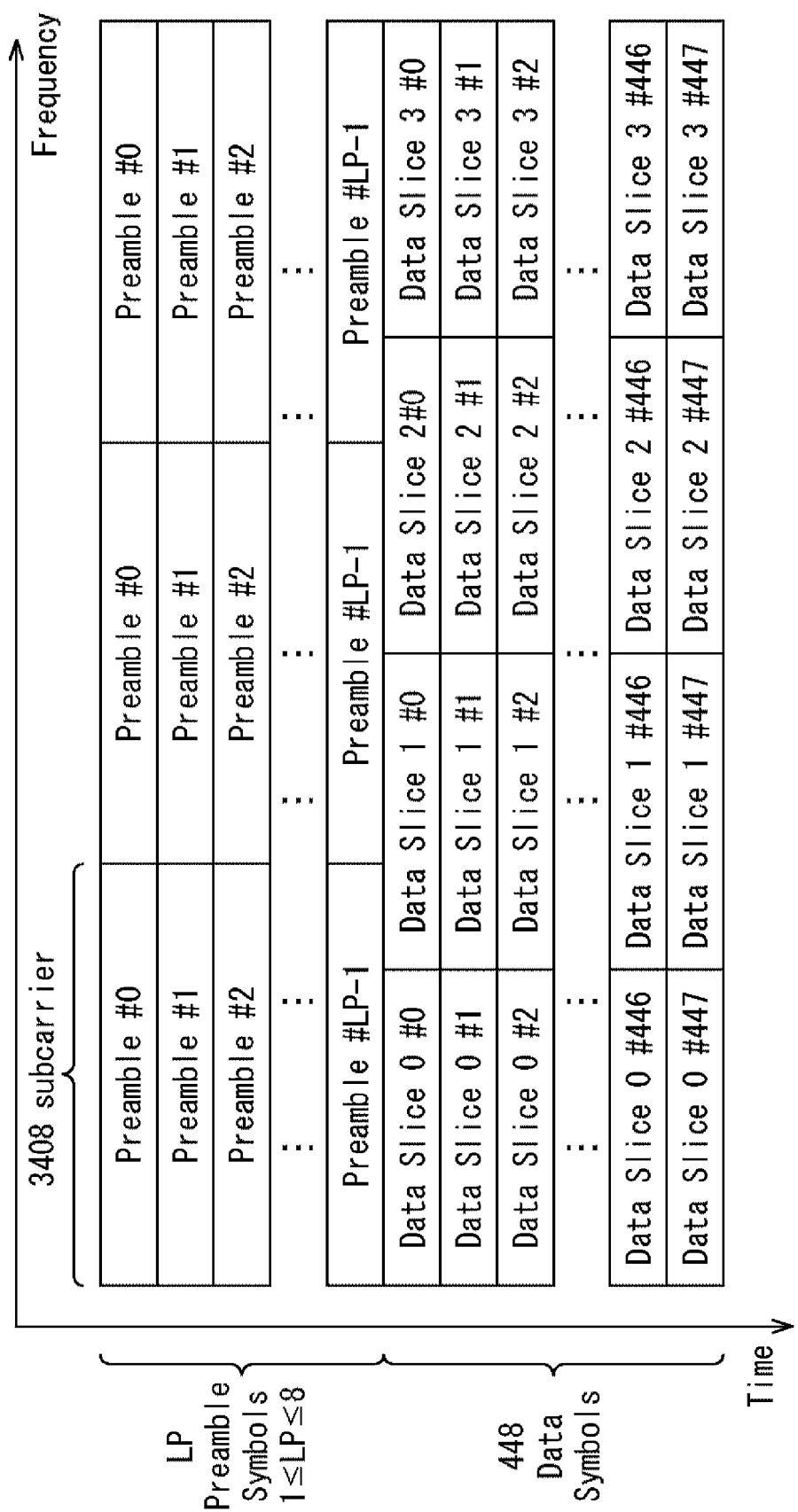
FIG. 3 is a diagram illustrating a configuration of C2 Frame.

FIG. 3 is a diagram illustrating a configuration of C2 Frame. The C2 Frame includes at least one Preamble Symbol and a plurality of Data Symbols. In FIG. 3, the abscissa denotes a frequency, and the ordinate denotes time (symbol). Preamble Symbol is repeatedly transmitted at a cycle of 3,408 subcarriers across first and eighth symbols as seen in a time direction.

The blocks of the Preamble Symbol denoted by the same reference numeral in FIG. 3 refer to the Preamble Symbol used to transmit the same L1 information. In addition, subsequent to the Preamble Symbol, Data Symbol is transmitted across 448 symbols as seen in a time direction. In the example of FIG. 3, each of data of Data Slices 0 to 3 is transmitted using 448 Data Symbols.

<Narrowband Notch>

Figure 4:
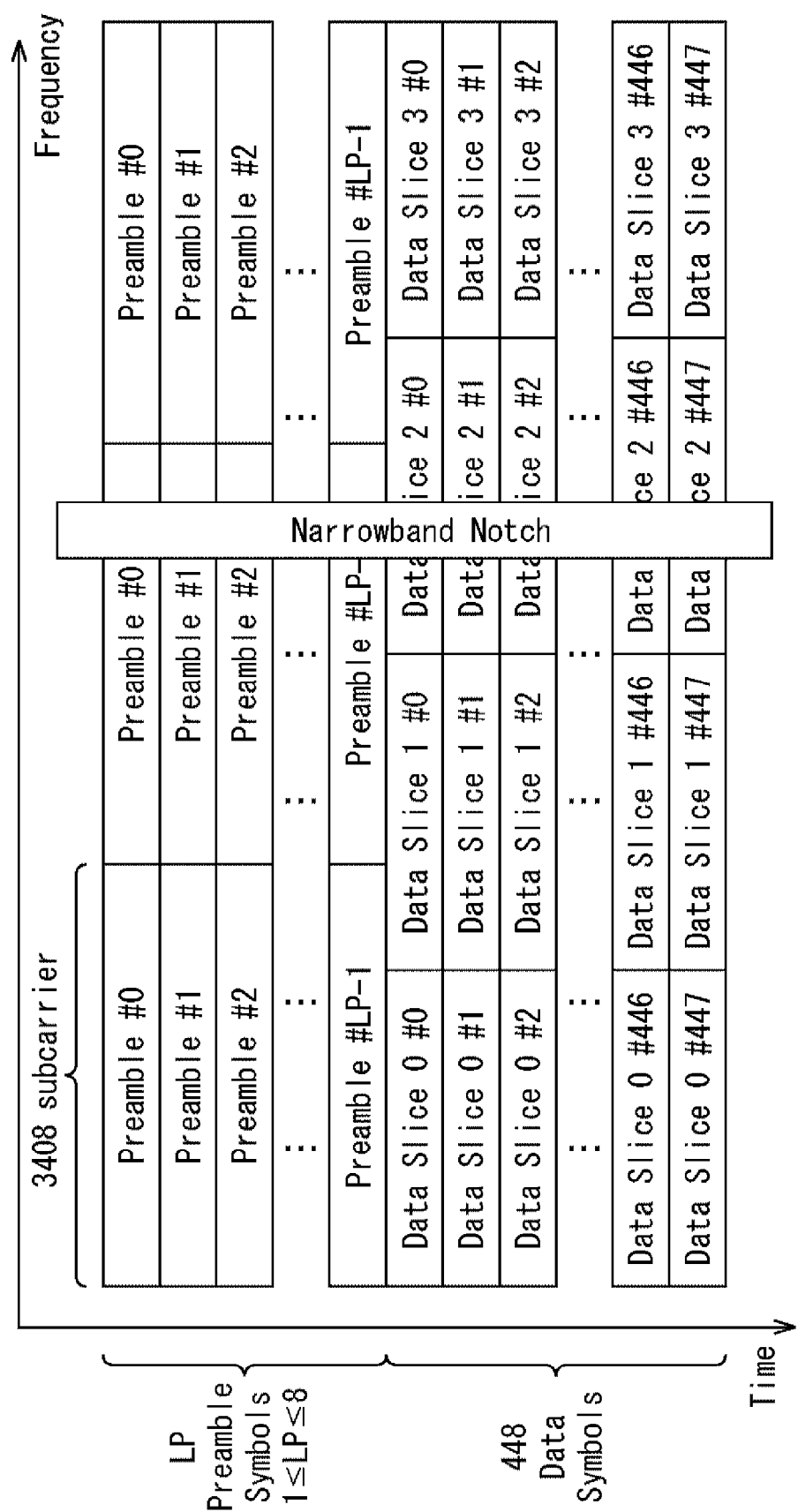
FIG. 4 is a diagram illustrating a configuration of C2 Frame in a case where a narrowband notch exists.

FIG. 4 illustrates a configuration of C2 Frame in a case where a narrowband notch exists. The narrowband notch has a bandwidth smaller than 48 subcarriers, and a single narrowband notch is allocated to 3,408 subcarriers. No data is contained in the notch band of Data Symbol, and the L1 information of Preamble Symbol of the notch band can be obtained (recovered) through an error correction process.

<Broadband Notch>

FIG. 5 illustrates a configuration of C2 Frame in a case where a broadband notch exists. The bandwidth of the broadband notch is greater than 47 subcarriers, and the broadband notch is arranged between a pair of Data Slices. In addition, the broadband notch is arranged at an interval of 3,408 or more subcarriers. Therefore, the notch band does not contain L1 information of Preamble Symbol and data of Data Symbol.

In this manner, according to DVB-C2, it is not necessary to provide a guard band between channels, and a relatively narrow band interposed between the Notches can also be used to transmit data. Therefore, it is possible to effectively use frequency bands. The receiving apparatus 1 receives a signal within a range of an Rx frequency band having a bandwidth of 7.61 MHz corresponding to 3,408 subcarriers at maximum and decodes L1 information. Then, the receiving apparatus 1 decodes program data based on the decoded L1 information.

<L1 Information>

Description will now be made for the decoded L1 information. FIG. 6 is a diagram illustrating parameters contained in L1 information. Description will focus on main parameters. "START_FREQUENCY" in the 3rd row denotes a frequency serving as a start position of C2 System. The start position is represented by an absolute frequency from 0 Hz. "C2_BANDWIDTH" in the 4th row denotes a bandwidth of C2 System.

"GUARD_INTERVAL" in the 5th row denotes a size of the guard interval included in each symbol. "C2_FRAME_LENGTH" in the 6th row denotes the number of Data Symbols contained in C2 Frame. In the example of FIG. 6, a value "448" is set to "C2_FRAME_LENGTH".

"NUM_DSLICE" in the 8th row denotes the number of Data Slices contained in C2 Frame. "NUM_NOTCH" in the 9th row denotes the number of Notches contained in C2 Frame. Each parameter from the 10th to 45th rows is described for each Data Slice.

"DSLICE_ID" in the 11th row denotes an identification (ID) of Data Slice in C2 System. "DSLICE_TUNE_POS" in the 12th row denotes a position (center frequency) serving as a tuning point for receiving Data Slice with respect to a frequency represented by "START_FREQUENCY". "DSLICE_TI_DEPTH" in the 15th row denotes a depth of time interleaving.

"DSLICE_LEFT_NOTCH" in the 21st row denotes whether or not there is Notch in the left side of Data Slice. "DSLICE_NUM_PLP" in the 22nd row denotes the number of physical layer pipes (PLPs) contained in Data Slice. Each parameter described in the 23rd to 43rd rows is described for each PLP.

Each parameter of the 46th to 50th rows is described for each Notch. "NOTCH_START" of the 47th row denotes a location of Notch with respect to the frequency represented by "START_FREQUENCY". "NOTCH_WIDTH" of the 48th row denotes a bandwidth of Notch.

Details of DVB-C2 are described in "Digital Video Broadcasting (DVB); Frame structure channel coding and modulation for a second generation digital transmission system for cable systems (DVB-C2)" (DVB Document A138).

<Operation of Receiving Apparatus>

Next, description will be made for operations of the receiving apparatus 1 of FIG. 1. The receiving apparatus 1 processes the received broadcast wave, demodulates program data desired by a user, and provides the program data to a user. As a user tunes to a desired program, the receiving apparatus 1 performs processing based on the tuning, and a program of the tuning target is provided to a user. A process performed at the time of such tuning will be described below. First, a basic process executed in each part of the receiving apparatus 1 will be described with reference to the flowchart of FIG. 7.

In step S11, the control unit 18 sets a receive (Rx) frequency depending on an Rx channel set using a manipulation unit (not illustrated). As a result, a center frequency and an Rx band are set depending on the Rx channel. As described below, according to the present embodiment, the center frequency is set to a center frequency suitable for reading data of the selected channel. However, in a case where it is difficult to obtain L1 information using that center frequency, the L1 information is obtained using a center frequency set by the transmit (Tx) side. In this step S11, a process for setting the Rx frequency to a frequency for obtaining L1 information is performed.

In step S12, the tuner 12 converts the RF signal received by the antenna 11 into an intermediate frequency (IF) signal and outputs the IF signal. The IF signal output from the tuner 12 is supplied to the AGC unit 13. In step S13, the AGC unit 13 performs automatic gain control (AGC) for the supplied IF signal. That is, the AGC unit 13 controls a gain such that a signal level of the IF signal becomes constant. The IF signal subjected to the control is output to the A/D conversion unit 14. In step S14, the A/D conversion unit 14 performs analog-digital conversion for the IF signal from the AGC unit 13 and outputs the digital IF signal to the quadrature demodulation unit 15.

In step S15, the quadrature demodulation unit 15 performs quadrature demodulation for the IF signal from the A/D conversion unit 14 using a carrier having a predetermined frequency and outputs the OFDM time domain signal to the OFDM demodulation unit 16. In step S16, the synchronization unit 31 of the OFDM demodulation unit 16 synchronizes the OFDM symbol. That is, the synchronization unit 31 determines a start position of the FFT block as a signal block for causing the FFT computation unit 32 to perform FFT computation. Information on the determined start position of the FFT block is supplied to the FFT computation unit 32 in the subsequent stage.

In step S17, the FFT computation unit 32 performs FFT computation for the OFDM time domain signal. More specifically, the FFT computation unit 32 sets the FFT block based on the start position of the FFT block determined by the synchronization unit 31 and extracts a signal of the FFT block from the OFDM time domain signal. In addition, the FFT computation unit 32 performs FFT computation for the extracted OFDM time domain signal. In step S18, the OFDM equalization unit 33 equalizes the OFDM frequency domain signal subjected to the FFT computation such that an amplitude and a phase of the received signal match those of the Tx signal.

In step S19, the error correction unit 17 performs de-interleaving for the equalized signal supplied from the OFDM equalization unit 33 and various processes such as de-puncturing, Viterbi decoding, removal of a spread spectrum signal, and RS decoding. In addition, the error correction unit 17 extracts L1 information, as transmission control information, from the decoded data obtained by performing various processes and supplies the extracted L1 information to the transmission parameter interpreting unit 19 of the control unit 18. The extracted L1 information is supplied to the transmission parameter interpreting unit 19 and is interpreted (analyzed).

A position of the data slice (center frequency), a position of the notch, and the like are obtained by analyzing L1 information. The program data are demodulated based on such information. The center frequency is readjusted to a center frequency of Data Slice corresponding to the instructed program based on the information included in L1 information from the Rx band of the center frequency set when the L1 information is obtained, and the process subsequent to step S20 is performed.

The readjustment of the center frequency may be omitted in some cases according to the present embodiment as described below. In this case, the time taken in the tuning is reduced. In addition, in a case where the center frequency is not readjusted, that is, in a case where the center frequency set when the L1 information is obtained is continuously used, the process subsequent to step S20 is omitted (processing time is reduced). Therefore, it is possible to further reduce the time taken in the tuning.

In step S20, the tuner 12 converts the RF signal received by the antenna 11 into an IF signal and outputs the IF signal. In step S21, the AGC unit 13 performs automatic gain control (AGC) for the IF signal. In this case, in a case where the center frequency is continuously used, the AGC is already stabilized. Therefore, it is possible to reduce a processing time without performing stability waiting in AGC. In a case where the center frequency is readjusted, the stability waiting time of AGC may be necessary in some cases. In step S22, the A/D conversion unit 14 performs analog-digital conversion for the IF signal from the AGC unit 13 and outputs the digital IF signal to the quadrature demodulation unit 15.

In step S23, the quadrature demodulation unit 15 performs quadrature demodulation for the IF signal from the A/D conversion unit 14 using a carrier having a predetermined frequency and outputs the OFDM time domain signal to the OFDM demodulation unit 16. In step S24, the synchronization unit 31 of the OFDM demodulation unit 16 synchronizes the OFDM symbol. This synchronization may be omitted because synchronization is already obtained in a case where the center frequency is continuously used. Therefore, it is possible to eliminate the time taken in synchronization. Similarly, in the following process, in a case where the center frequency is continuously used, the processing time thereof is shortened.

In step S25, the FFT computation unit 32 performs FFT computation for the OFDM time domain signal of the FFT block. In step S26, the OFDM equalization unit 33 equalizes the OFDM frequency domain signal subjected to the FFT computation.

In step S27, the error correction unit 17 performs de-interleaving for the equalized signal supplied from the OFDM equalization unit 33 and performs various processes such as de-puncturing, Viterbi decoding, removal of a spread spectrum signal, and RS decoding. In addition, the error correction unit 17 outputs a transport stream as program data corresponding to the Rx channel, obtained by performing various processes, to an external output unit, an output buffer, or the like in the subsequent stage, and the process is terminated.

In this manner, the program data is decoded based on the decoded L1 information obtained by decoding the L1 information. This decoded program data is data of a program broadcasted in a channel set as a default or a program broadcasted on a channel selected by a user's instruction. Next, description will be made for a tuning process. Similarly, in the following description, the aforementioned processes are performed in each part of the receiving apparatus 1, and description thereof will not be repeated for avoid redundancy.

<Tuning Process>

Referring to the flowchart of FIG. 7 again, a process for obtaining L1 information is executed in steps S11 to S19, and a process for demodulating the program data based on the obtained L1 information is performed in steps S20 to S27. In this process flow, the Rx frequency is set to obtain L1 information. Then, the Rx frequency for receiving the program data is set after obtaining the L1 information. That is, frequency setting (tuning) is performed twice.

Similarly, in a case where a predetermined channel is instructed by a user, and tuning is performed to the instructed channel, basically, the process is performed such that L1 information is obtained, a center frequency of the channel instructed by a user is set based on the L1 information, and a receiving process is initiated. Therefore, the frequency setting is performed twice. However, if the frequency setting is performed twice for each tuning, the time taken in the tuning process increases. In this regard, the time taken in the tuning process is shortened by performing the tuning process as described below.

Figure 8:
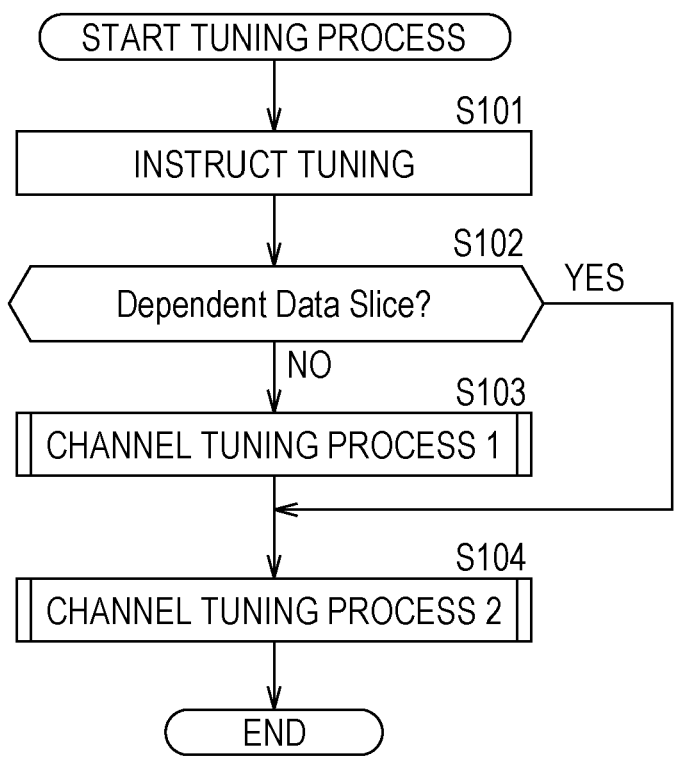
FIG. 8 is a flowchart illustrating a tuning process.
Figure 9:
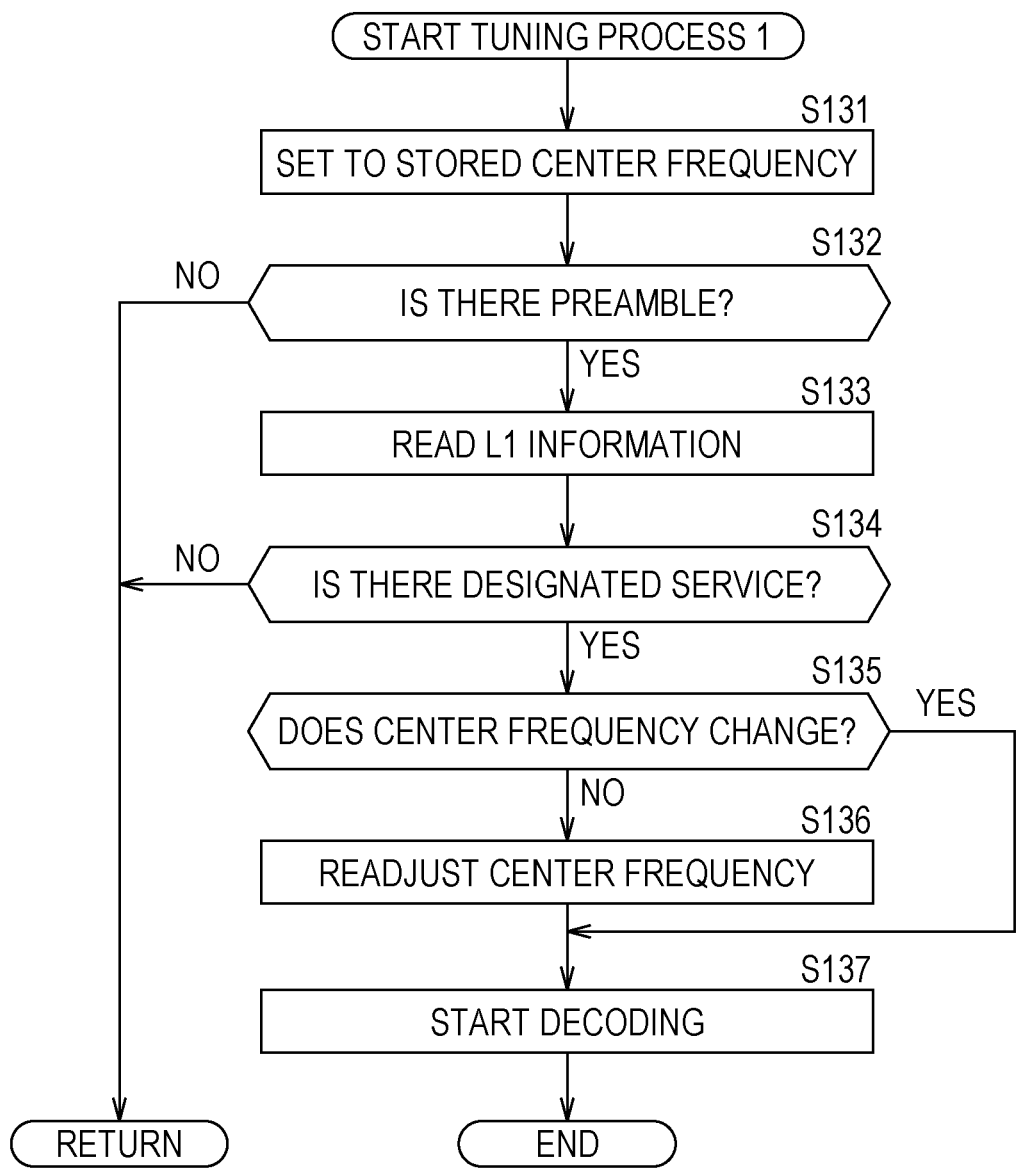
FIG. 9 is a flowchart illustrating a tuning process 1.
Figure 10:
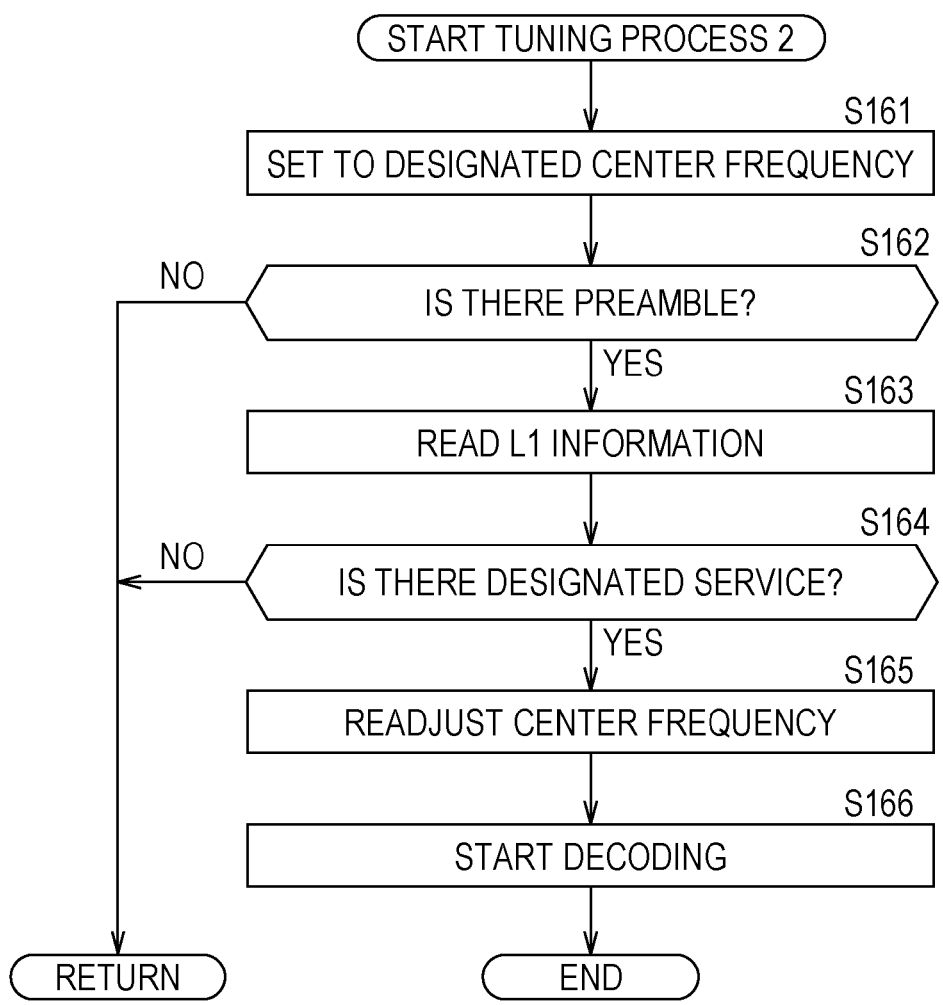
FIG. 10 is a flowchart illustrating a tuning process 2.

FIGS. 8 to 10 are flowcharts illustrating a tuning process. In step S101, as the tuning is instructed, the process starts. It is determined that the tuning is instructed, and the process starts, as a trigger, when the receiving apparatus 1 is powered on or when switching from the set channel to another channel is instructed by a user, and the like.

In step S102, it is determined whether or not Data Slice of the tuning target is Dependent DS. The Dependent DS is Data Slice, for example, in a case where a broadband notch (Broadband Notch) exists as illustrated in FIG. 5. In this notch band, L1 information of Preamble Symbol and data of Data Symbol are not contained as described above. Even when the center frequency is shifted to the designated Data Slice in order to decode that Data Slice, it may be difficult to obtain L1 information if a notch exists. Therefore, first, it is determined whether or not Data Slice of the tuning target is Dependent Data Slice having a notch.

Since it is recognized where the notch exists when L1 information is obtained, a flag is asserted when Data Slice includes a notch, and this information is stored in the memory unit 20. That is, when L1 information is interpreted by the transmission parameter interpreting unit 19, a part or overall of the information is stored in the memory unit 20. As a timing for storing the information, for example, the obtained L1 information is stored at the time of channel scanning performed when the receiving apparatus 1 is initially powered on. In addition, as described below, this stored information is appropriately updated because the information may change.

Here, description will be made by assuming that the memory unit 20 manages a table illustrated in FIG. 11. In a table 101 of FIG. 11, ID for identifying Data Slice, a center frequency adjusted when Data Slice is read, and a flag representing whether or not Data Slice is Dependent Data Slice (DDS) are stored by mapping each other. In the table 101 of FIG. 11, it is assumed that a circle O in the column DDS means that a flag is asserted. For example, it is read that a center frequency of Data Slice of ID "0" is set to "$f_0$", and the flag of DDS is not asserted. In addition, for example, it is read that a center frequency of Data Slice of ID "1" is set to "$f_1$", and the flag of DDS is asserted.

Such information can be obtained from L1 information. For example, referring to FIG. 6 again, ID of Data Slice is read from "DSLICE ID" of the 11th row, and the center frequency is read from "DSLICE TUNE POS" of the 12th row. A flag representing whether or not the DS is DDS can be determined from information of "DSLICE_LEFT_NOTCH" described in the 21st row or information of "NOTCH START" and "NOTCH WIDTH" described in the 47th and 48th rows, respectively.

Alternatively, although description is made here using a table, methods using other than the table may be employed to manage the information obtained from L1 information. Alternatively, information obtained from the L1 information other than information on the ID, the center frequency, and the DDS flag of FIG. 11 may be managed.

Returning to the flowchart of FIG. 8, in step S102, it is determined whether or not Data Slice designated as the tuning target is Dependent Data Slice by referencing the table 101 of FIG. 11. If it is determined that Data Slice designated as the tuning target is Dependent Data Slice in step S102, the process advances to step S104. If it is determined that Data Slice designated as the tuning target is not Dependent Data Slice, the process advances to step S103.

In step S103, the tuning process 1 is executed. In this case, since Data Slice designated as the tuning target is not Dependent Data Slice, Data Slice where L1 information is read without an influence from a notch and the like is Data Slice corresponding to the tuning target.

FIG. 9 is a flowchart illustrating details of the tuning process 1 executed in step S103. In step S131, a frequency of the tuner 12 is set to the center frequency used to read the designated Data Slice with reference to the table 101 stored in the memory unit 20. In step S132, an Rx band having a bandwidth of, for example, 7.61 MHz with respect to the set center frequency is set, and a signal within that range is received and processed. Here, description will be made in more detail for the Rx band with reference to FIG. 12.

Figure 12:
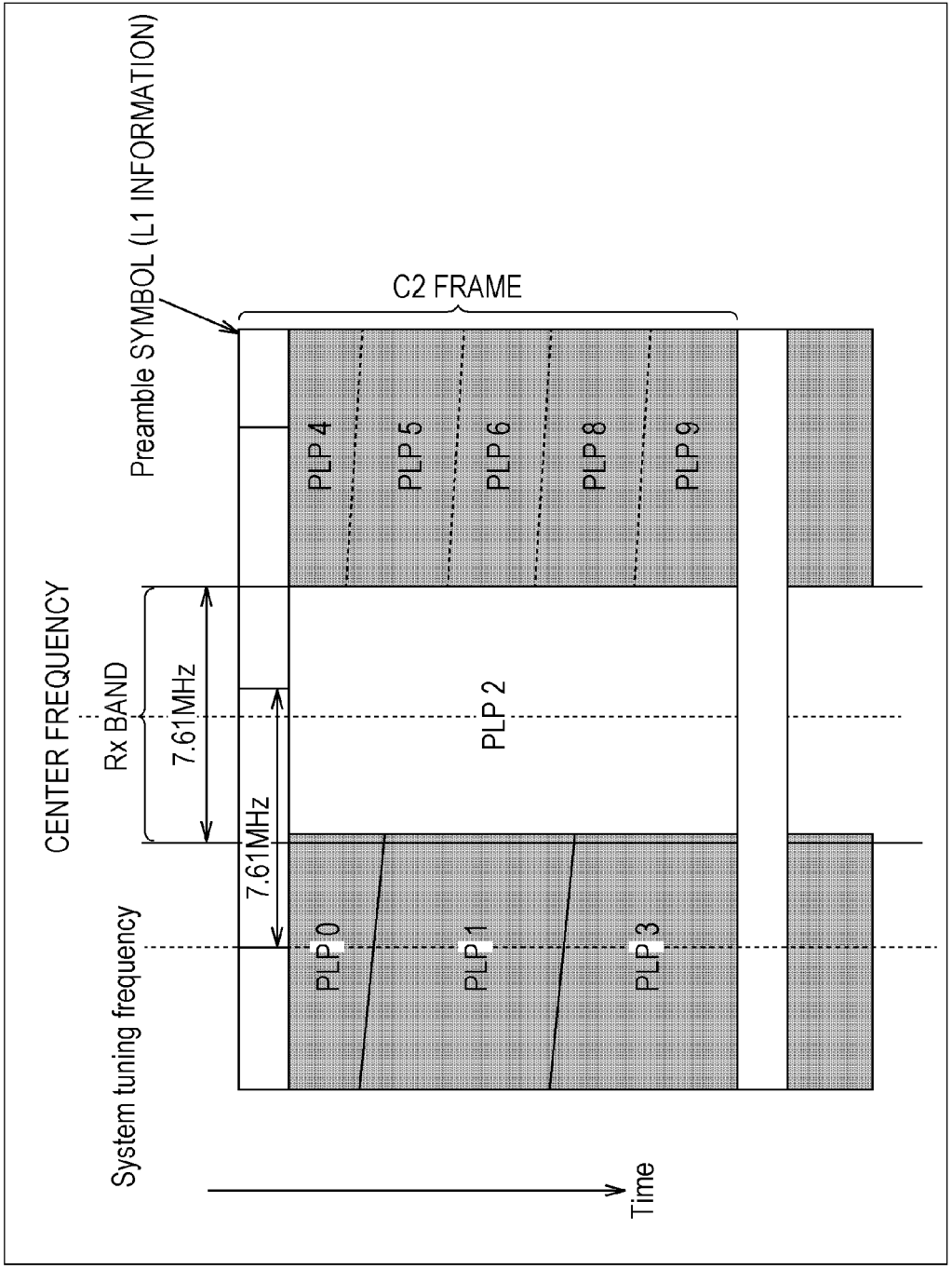
FIG. 12 is a diagram illustrating a center frequency.

FIG. 12 is a partially enlarged view illustrating C2 System of DVB-C2 of FIG. 2. In FIG. 12, the Rx band is set on Data Slice including PLP2 and has a bandwidth of 7.61 MHz centered at the center frequency. In a case where Data Slice including, for example, PLP4 is set as a tuning target, this Rx band is shifted to that Data Slice. A signal in the Rx band set in this manner is received and processed.

In step S131 (FIG. 9), a center frequency of Data Slice of the channel set as a tuning target is read from the table 101, a tuner 12 is tuned to the read center frequency, and a signal in the Rx band set using a bandwidth centered at that center frequency is received. In step S132, it is determined whether or not the received signal contains a preamble signal.

If it is determined that the received signal contains a preamble signal in step S132, the process advances to step S133. In step S133, L1 information is read and analyzed. In step S134, it is determined whether or not there is a designated service. In this case, the designated service is a program (channel) designated by a user. It is determined whether or not the L1 information contains information on the designated service (whether or not there is Data Slice). If it is determined that there is the designated service in step S134, the process advances to step S135.

In step S135, it is determined whether or not the center frequency changes. This determination is performed by determining whether or not the center frequency set at that time matches the center frequency read from the L1 information. If it is determined that the center frequency changes in step S135, the process advances to step S136. In step S136, the center frequency is readjusted. That is, the center frequency (Rx band) is set based on the information read from L1 information.

As the center frequency is readjusted, the frequency of the tuner 12 is readjusted. In addition, readjustment is also performed for the process subsequent to the operation of the tuner 12, such as the stability waiting of AGC, frame synchronization, frequency synchronization, and sampling synchronization. Then, in step S137, decoding of the program data starts using the set center frequency. As the decoding of the program data starts, the tuning process is terminated.

Otherwise, if it is determined that the center frequency does not change in step S135, step S136 is skipped, and the process advances to step S137. In step S137, decoding is initiated. In this case, since the set center frequency does not change, step S136 for readjusting the center frequency is omitted. Therefore, it is not necessary to readjust the center frequency and perform stability waiting of AGC, synchronization, and the like again. Therefore, it is possible to shorten the time taken in the tuning.

That is, if the stored center frequency is set, and the center frequency does not change in step S131, the Rx band is set to a band including a preamble signal (L1 information) in step S132. Therefore, the preamble signal is obtained, and L1 information is read. Since it is determined that there is a designated service (Data Slice) in step S134, and the center frequency does not change in step S135, the process advances to step S137. In this manner, since the tuning is performed just by reading the stored center frequency, the time taken in the tuning is shortened.

According to DVB-C2, for example, a broadband signal called C2 System, in which a plurality of signals including DS1 and DS2 is arranged, is employed as described with reference to FIG. 2. Control information necessary to extract a desired signal from the broadband signal, for example, information on the center frequency is contained in L1 information as a preamble signal. According to the present embodiment, control information obtained once is stored in the memory unit 20.

In addition, when it is necessary to extract a predetermined signal (Data Slice of a predetermined channel) in response to a user's instruction and the like, control information for extracting the predetermined signal serving as an extraction target is read from the memory unit 20. Then, the predetermined signal is extracted based on the read control information. Therefore, as described above, it is possible to shorten the time taken in the tuning.

Meanwhile, if it is determined that there is no preamble in step S132, or it is determined that there is no designated service in step S134, the process advances to step S104 (FIG. 8). In this case, although there is a try to extract a predetermined signal from the broadband signal based on the stored center frequency (control information), it is difficult to extract the predetermined signal. In this case, in step S104, a tuning process 2 is executed. In the tuning process 2, control information is obtained from the broadband signal again, and a try to extract a predetermined signal is made again based on the obtained control information. This tuning process 2 will be described with reference to the flowchart of FIG. 10.

In step S161, a frequency is set to the designated frequency. In the tuning process 1 described above, it is difficult to start decoding of the program data on the instructed channel using the stored center frequency. Therefore, the frequency is set to a frequency designated in the Tx side, capable of obtaining L1 information, different from the center frequency. Here, FIG. 12 will be referred again.

In FIG. 12, "System Tuning Frequency" is a frequency set by the Tx side. According to "DVB-C2 Implementation Guidelines ETSITS 102 991 V1.1.2 10.1.2", it is specified that the tuning is performed such that, at the time of tuning, first, a receive operation is performed by tuning to this System Tuning Frequency to read L1 information, and shifting is made to a desired channel (Data Slice) based on the read L1 information. That is, a frequency is first set to "System Tuning Frequency", and is then readjusted to a desired center frequency. In other words, a center frequency of a desired channel is not directly set. Instead, a frequency is set to "System Tuning Frequency" once and is then set to a center frequency of a desired channel based on information obtained thereby.

If such a work is performed for each tuning process, it is necessary to perform frequency setting at least twice. Therefore, a processing time taken in the tuning increases. However, as described above, in the tuning process 1, a frequency is set to not "System Tuning Frequency" but the stored center frequency. Therefore, it is possible to directly set a frequency to the center frequency of a desired channel. Accordingly, it is possible to shorten the time taken in the tuning.

Returning to description of step S161 of FIG. 10, a frequency of the tuner 12 is set to the designated frequency, that is, "System Tuning Frequency". In step S162, it is determined whether or not there is a preamble. If it is determined that there is a preamble, the process advances to step S163. In step S163, L1 information is read. Basically, it is conceived that it is possible to obtain a preamble because "System Tuning Frequency" set in the Tx side is used a center frequency. However, if it is determined that there is no preamble due to any error, the tuning process is terminated. In this case, a message may be notified to a user.

In step S164, it is determined whether or not there is a designated service. If it is determined that there is a designated service, the process advances to step S165. In a case where there is no program (channel) instructed by a user, it is determined that there is no designated service in step S164, and the tuning process is terminated. Similarly, in this case, a message may be notified to a user.

In step S165, a frequency of the tuner 12 is set to the center frequency of the tuning target instructed by a user based on the obtained L1 information. In addition, an Rx band centered at that center frequency is set, and a received signal is processed, so that a predetermined program is provided to a user.

In this manner, it is possible to shorten the time taken in the tuning, compared to a case where a frequency is once set to "System Tuning Frequency" by shifting to the tuning target using the stored center frequency, and the shifting to the tuning target is performed again. Even when the center frequency and the like are changed in the Tx side, such a fact can be detected, and a program can be received and processed using "System Tuning Frequency" set in the Tx side. Therefore, it is possible to prevent a situation that the tuning is unable.

For example, the table 101 stored in the memory unit 21 may be updated using the L1 information read in step S133 or S163. In addition, in a case where it is determined that there is a change in the center frequency in step S135 (FIG. 9), a frequency where the change is detected may be updated using the obtained L1 information.

Returning to the flowchart of FIG. 8, if it is determined that the Data Slice of the tuning target is Dependent Data Slice in step S102, the process advances to step S104. In this case, Data Slice of the tuning target is Dependent Data Slice. If the Rx band is set based on the center frequency of the designated Data Slice, a notch is included in the corresponding Rx band.

Since it may be difficult to obtain a preamble signal (L1 information) from any part of this Data Slice, the L1 information is obtained by setting the frequency set in the Tx side as a center frequency. In addition, a predetermined signal is extracted based on the obtained control information. Such a process flow is similar to the process flow of the tuning process 2. For this reason, in step S104, the tuning process 2 is executed. The tuning process 2 has been already described with reference to the flowchart of FIG. 10, and description thereof will not be repeated.

It is possible to shorten the time taken in the tuning by performing the tuning process in this manner. The reason thereof will be exemplarily described hereinafter. For example, in the example of FIG. 2, Data Slices DS0, DS1, DS2, ..., and DS8 are set as Data Slices. The bandwidths of these Data Slices can be changed in the Tx side. For example, Data Slice DS1 may include two Data Slices. If the two divided Data Slices are denoted by DS1' and DS1", a center frequency $f_1'$ for DS1' and a center frequency $f_1''$ for DS1" are also set anew. If the number of Data Slices (number of channels) changes in this manner, parameters and the like relating thereto also change.

In this manner, according to DVB-C2, there are a possibility that the number of channels changes and a possibility that L1 information changes. Therefore, even when information on the center frequency included in L1 information is stored, a frequency is set to the stored center frequency, and a receive operation is initiated as described above, it may be difficult to receive a signal due to the possibility of information change.

Therefore, in order to reliably receive a signal, as described above in conjunction with the tuning process 2, a receive operation is initiated using "System Tuning Frequency" once, L1 information is decoded, and a frequency is then tuned to a desired channel again using information on the center frequency described in the L1 information. However, apparently, such a 2-stage tuning method takes more time compared to a single stage tuning method. Information such as the number of channels may change in the Tx side as described above. However, it is conceived that such information does not change frequently. Therefore, the flow described above as the tuning process 1, that is, a single stage tuning method is performed in many cases. Therefore, it is possible to shorten the time taken in the tuning.

Even when information such as the number of channels changes, step for detecting the change such as step S132 or S134 (FIG. 9) is provided in the tuning process 1. Therefore, it is possible to handle a case where there is a change. In addition, when there is a change, the frequency set in the Tx side is used in the tuning process 2. Therefore, it is possible to reliably obtain L1 information.

Although description in the embodiments described above has been made by exemplifying a DVB-C2, the present technology can be applied to other broadcast schemes. For example, the present technology can be applied to a transmission scheme having a frequency band that does not transmit a signal corresponding to a notch. Furthermore, the present technology can be applied to a situation, without limiting to broadcasting, for example, when a desired signal (data) is extracted from a broadband signal.

<Recording Medium>

A series of the aforementioned processes may be executed using hardware or software. In a case where a series of processes is executed using software, a program embodied in the software is installed in a computer. Here, the computer includes, for example, a computer integrated into dedicated hardware, a general-purpose personal computer capable of executing various functions by installing various programs, and the like.

Figure 13:
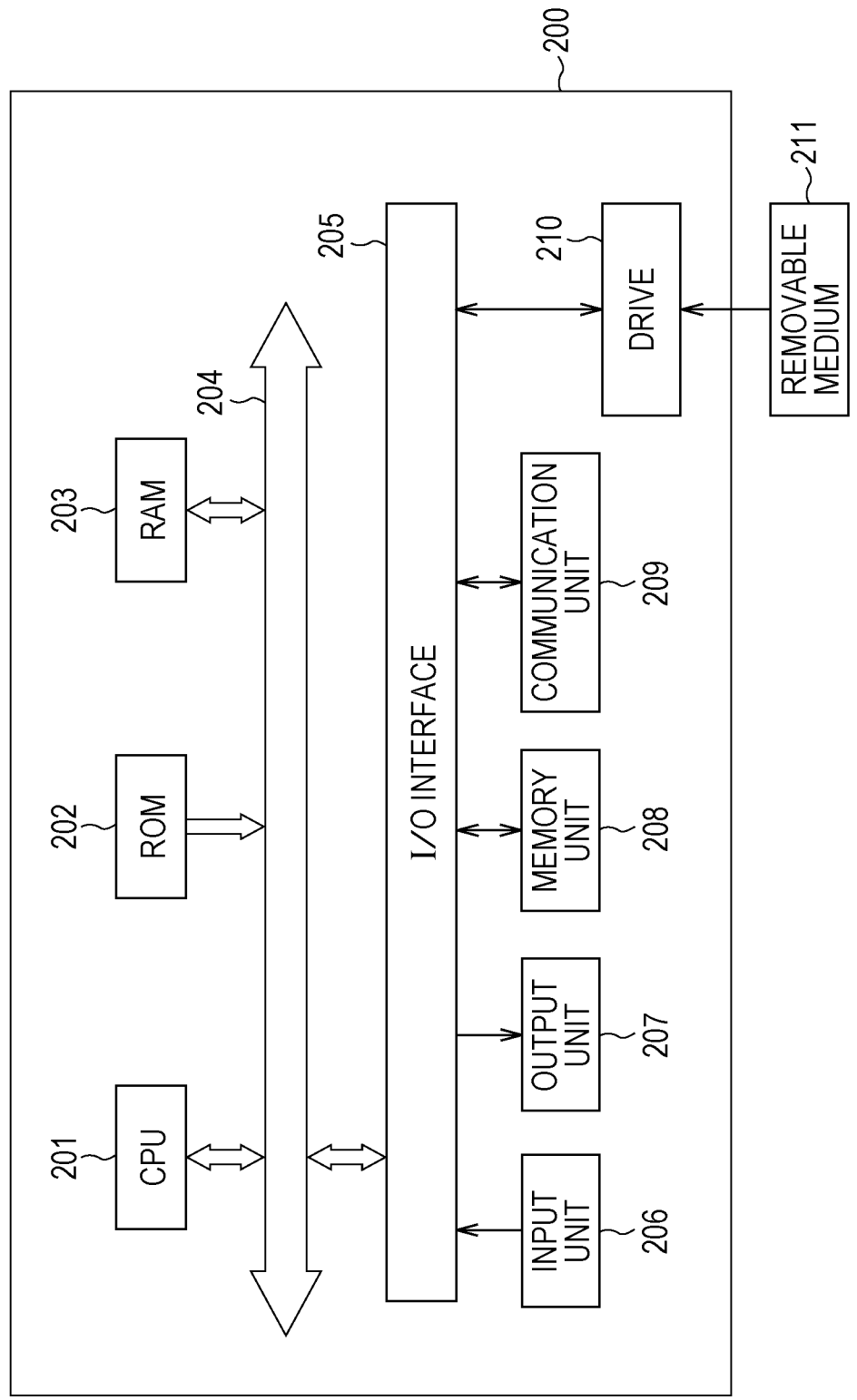
FIG. 13 is a diagram illustrating a recording medium.

FIG. 13 is a block diagram illustrating an exemplary configuration of hardware of a computer that executes a series of the aforementioned processes using a program. In the computer, a central processing unit (CPU) 201, a read-only memory (ROM) 202, and random access memory (RAM) 203 are connected to each other via a bus 204. In addition, an input/output (I/O) interface 205 is connected to the bus 204. An input unit 206, an output unit 207, a memory unit 208, a communication unit 209, and a drive 210 are connected to the I/O interface 205.

The input unit 206 includes a keyboard, a mouse, a microphone, and the like. The output unit 207 includes a display, a loudspeaker, and the like. The memory unit 208 includes a hard disk, a nonvolatile memory, and the like. The communication unit 209 includes a network interface and the like. The drive 210 drives a removable medium 211 such as a magnetic disc, an optical disc, an opto-magnetic disc, or a semiconductor memory.

In the computer configured as described above, a series of the processes described above is performed by causing the CPU 201 to load the program, for example, stored in the memory unit 208 on the RAM 203 via the I/O interface 205 and the bus 204 and execute the program.

The program executed by the computer (CPU 201) may be recorded and provided, for example, in a removable medium 211 such as a package medium. In addition, the program may be provided via a wired/wireless transmission medium such as a local area network (LAN), the Internet, or digital satellite broadcasting.

In a computer, the program may be installed in the memory unit 208 via the I/O interface 205 by mounting the removable medium 211 in the drive 210. Alternatively, the program may be received by the communication unit 209 via a wired/wireless transmission medium and may be installed in the memory unit 208. Alternatively, the program may be installed in the ROM 202 or the memory unit 208 in advance.

The program executed by the computer may be a program that processes steps in a time-series manner according to the sequence described herein or may be a program executed in parallel or at a necessary timing such as a call.

Herein, a system refers to an entire apparatus including a plurality of units.

The embodiments of the present technology are not limited to those described above. Instead, they may be variously changed or modified without departing from the spirit and scope of the invention.

The present technology may be embodied as the following configurations.

(1) A receiving apparatus includes:

a memory unit that obtains, from a broadband signal, control information used to extract a predetermined signal from the broadband signal where a plurality of signals is arranged and stores the control information; and an extraction unit that reads the control information stored in the memory unit to extract the predetermined signal and extracts the predetermined signal from the broadband signal based on the control information.

(2)

The receiving apparatus of (2), wherein the broadband signal is a signal conforming to a DVB-C2 standard, and the control information is information on a frequency used to extract the predetermined signal.

(3)

The receiving apparatus of (1) or (2), wherein in a case where it is difficult to extract the predetermined signal using the extraction unit, the control information is obtained from the broadband signal, and the predetermined signal is extracted based on the obtained control information.

(4)

The receiving apparatus of any one of (1) to (3), wherein in a case where a no-signal band is included in the predetermined signal, the control information is obtained from the broadband signal using a frequency set in a transmit side of the broadband signal, and the extraction unit extracts the predetermined signal based on the obtained control information.

(5)

A receiving method includes:

obtaining, from a broadband signal, control information used to extract a predetermined signal from the broadband signal where a plurality of signals is arranged and storing the control information in a memory unit; and reading the control information stored in the memory unit to extract the predetermined signal and extracting the predetermined signal from the broadband signal based on the control information.

(6)

A program causes a computer to function as:

a memory unit that obtains, from a broadband signal, control information used to extract a predetermined signal from the broadband signal where a plurality of signals is arranged and stores the control information; and an extraction unit that reads the control information stored in the memory unit to extract the predetermined signal and extracts the predetermined signal from the broadband signal based on the control information.

REFERENCE SIGNS LIST

1 Receiving apparatus
11 Antenna
12 Tuner
13 AGC unit
14 A/D conversion unit
15 Quadrature demodulation unit
16 OFDM demodulation unit
17 Error correction unit
18 Control unit
19 Transmission parameter interpreting unit
20 Memory unit
31 Synchronization unit
32 FFT computation unit
33 OFDM equalization unit

The invention claimed is:

1. A receiving apparatus comprising:
  a memory unit configured to obtain, from a broadband signal, control information used to extract a predetermined signal from the broadband signal where a plurality of signals are arranged and stores the control information; and
  an extraction unit configured to read the control information stored in the memory unit to extract the predetermined signal and extracts the predetermined signal from the broadband signal based on the control information, wherein
  when a no-signal band is included in the predetermined signal, the control information is obtained from the broadband signal using a frequency set in a transmit side of the broadband signal, and the extraction unit extracts the predetermined signal based on the obtained control information.

2. The receiving apparatus according to claim 1, wherein
  the broadband signal is a signal conforming to a DVB-C2 standard, and
  the control information is information on a frequency used to extract the predetermined signal.

3. A receiving method comprising:
  obtaining, from a broadband signal, control information used to extract a predetermined signal from the broadband signal where a plurality of signals are arranged and store the control information in a memory unit; and
  reading the control information stored in the memory unit to extract the predetermined signal and extracting the predetermined signal from the broadband signal based on the control information, wherein
  when a no-signal band is included in the predetermined signal, the control information is obtained from the broadband signal using a frequency set in a transmit side of the broadband signal, and the extraction unit extracts the predetermined signal based on the obtained control information.

4. A non-transitory computer readable medium storing program code being executable by a processor to perform operations comprising:
  obtaining, from a broadband signal, control information used to extract a predetermined signal from the broadband signal where a plurality of signals are arranged and store the control information in a memory unit; and
  reading the control information stored in the memory unit to extract the predetermined signal and extracting the predetermined signal from the broadband signal based on the control information, wherein
  when a no-signal band is included in the predetermined signal, the control information is obtained from the broadband signal using a frequency set in a transmit side of the broadband signal, and the extraction unit extracts the predetermined signal based on the obtained control information.

5. The receiving method according to claim 3, wherein
  the broadband signal is a signal conforming to a DVB-C2 standard, and
  the control information is information on a frequency used to extract the predetermined signal.

6. The computer readable medium of claim 4, wherein
  the broadband signal is a signal conforming to a DVB-C2 standard, and
  the control information is information on a frequency used to extract the predetermined signal.

* * * * *